(12) United States Patent
Yasui et al.

(10) Patent No.: US 7,501,786 B2
(45) Date of Patent: Mar. 10, 2009

(54) STABILIZER CONTROL APPARATUS

(75) Inventors: Yoshiyuki Yasui, Nagoya (JP); Yuuki Ohta, Kariya (JP); Daisuke Yamada, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 182 days.

(21) Appl. No.: 10/587,717

(22) PCT Filed: Feb. 10, 2005

(86) PCT No.: PCT/JP2005/002071

§ 371 (c)(1),
(2), (4) Date: Jul. 28, 2006

(87) PCT Pub. No.: WO2005/077685

PCT Pub. Date: Aug. 25, 2005

(65) Prior Publication Data

US 2007/0119644 A1    May 31, 2007

(30) Foreign Application Priority Data

Feb. 12, 2004    (JP)    ............................. 2004-034501

(51) Int. Cl.
*H02P 23/00* (2006.01)
(52) U.S. Cl. .................... 318/799; 318/610; 318/652
(58) Field of Classification Search .............. 318/799, 318/610, 3, 652; 280/5.511
See application file for complete search history.

(56) References Cited

U.S. PATENT DOCUMENTS 4,892,329 A    1/1990    Kozaki et al.
6,354,607 B1    3/2002    Kawashima et al.
6,425,585 B1    7/2002    Schuelke et al.

(Continued)

FOREIGN PATENT DOCUMENTS

EP    1 362 721 A2    11/2003

(Continued)

OTHER PUBLICATIONS

"Dynamic Drive", BMW Group: Innovation: Technology: [online], Jul. 30, 2002, 4 pages.

(Continued)

*Primary Examiner*—Karen Masih
(74) *Attorney, Agent, or Firm*—Buchanan Ingersoll & Rooney PC

(57) ABSTRACT

In a stabilizer control apparatus for transmitting a power through a speed reducing mechanism, a rolling motion of a vehicle body is restrained smoothly and rapidly, without being affected by transmitting efficiency of the speed reducing mechanism. As for a stabilizer (SBf) including a pair of stabilizer bars (SBfr, SBfl) disposed between a right wheel and a left wheel, and a stabilizer actuator (FT) driven by an electric motor disposed between them, the electric motor M is controlled in response to a turning state of a vehicle, to control a torsional rigidity of the stabilizer. Furthermore, the apparatus comprises relative position detection means for detecting the relative position of the pair of stabilizer bars (for example, obtained from a relationship between a rotational angle of the electric motor and a reducing speed ratio), and it is so constituted that the electric motor is controlled in response to the detected result.

3 Claims, 12 Drawing Sheets

U.S. PATENT DOCUMENTS

2005/0179220 A1 * 8/2005 Yasui et al. .............. 280/5.506

FOREIGN PATENT DOCUMENTS

| JP | 63-145118 A | 6/1988 |
| JP | 8-085328 A | 4/1996 |
| JP | 2000-071739 A | 3/2000 |
| JP | 2001-277833 A | 10/2001 |
| JP | 2002-518245 A | 6/2002 |
| WO | 02/098687 A1 | 12/2002 |

OTHER PUBLICATIONS

International Search Report dated Apr. 19, 2005.
European Search Report dated Nov. 5, 2007.

* cited by examiner

STABILIZER CONTROL APPARATUS

TECHNICAL FIELD

The present invention relates to a stabilizer control apparatus for a vehicle, and more particularly to a stabilizer control apparatus for controlling a torsional rigidity of a stabilizer disposed between a right wheel and a left wheel, by means of an electrically operated actuator.

BACKGROUND ART

In general, a stabilizer control apparatus for a vehicle is adapted to apply an appropriate roll moment to the vehicle from outside thereof according to an action of a stabilizer, while the vehicle is traveling with a turning operation, to reduce or restrain a rolling motion of a vehicle body. In order to achieve this function, in Non-Patent document 1 as cited hereinafter, for example, a system called "Dynamic Drive" has been proposed to stabilize the rolling motion of the vehicle actively by making use of hydraulic pressure. That is, a tandem pump actuated by an engine is used as a power source, and sensor signals • CAN signal are input, so that a lateral kinetic signal is determined on the basis of logical or mathematical combination of those signals. On the basis of those signals, a proportional pressure control valve for setting an active pressure and a directional control valve for ensuring the direction of oil are controlled. Two pressure sensors for front and rear axle stabilizers are provided in a valve block, and the detected pressures are fed back to a control unit, in the same manner as the direction control valve.

Also, there is known an active roll restraining control apparatus using an electric system. For example, in Patent document 1, proposed is an apparatus for controlling efficiency of a stabilizer to vary an apparent torsional rigidity of the stabilizer by driving and controlling an actuator in response to a turning level of a vehicle. In practice, it is so constituted that driving force of an electromagnetic linear actuator is calculated on the basis of signals of various sensors, and converted into electric value to provide a desired electric value for performing a PID control. And, it is described that the actuator is actuated to enlarge or shorten the stabilizer, so as to provide an appropriate torsional rigidity for it, by feeding exciting current to a stator having laminated plates with coils connected together in a three-phase delta circuit, in response to a synchronous signal based on the output of position detecting means, and feeding actual current back to it.

Furthermore, in Patent document 2, there is proposed a side roll stabilizing apparatus provided with the stabilizer bars divided into two portions and an electromechanical slewing actuator arranged between halves of the stabilizer bars. That is, in the Patent document 2, the electromechanical slewing actuator which is used for creating an initial stress torque, is constituted by three basic components, namely an electric motor, a step-down gear and a brake disposed between them. The torque generated by the electric motor is converted by the step-down gear into the torque needed for the initial stress of the stabilizer. One stabilizer half is supported directly by the electromechanical slewing actuator or housing via a bearing mount, and the other stabilizer half is connected to the output end (high torque end) of the step-down gear and is mounted in the bearing mount.

Patent document 1:
Japanese Patent Laid-open Publication No.2000-71739
Patent document 2:
Japanese Patent Laid-open Publication No.2002-518245
Non-Patent document 1:
Dynamic Drive. Technology. [online]. BMW Group, 2002. [retrieved on 2003-12-08]. Retrieved from the Internet: <URL:http://www.bmwgroup.com/e/0_0_www_bmw-group_com/7$_{13}$ innovation/7_3_technologie/7_3_4_dynamic_drive.shtml>

DISCLOSURE OF THE INVENTION

Problems to be Solved by the Invention

Non-Patent document 1 as cited above relates to an active roll restraining control apparatus using an electric-hydraulic pressure system, which controls the proportional pressure control valve and directional control valve in response to a signal of a pressure sensor, to perform a so-called pressure control. According to the apparatus for restraining the roll actively by means of the stabilizer, in order to restrain the rolling motion when the vehicle is turning, a roll moment is provided by controlling the stabilizer, against the roll moment created by inertia force applied to the vehicle body during the turning operation. Therefore, it is required to provide the pressure for a stabilizer actuator, which is converted directly into the roll moment, to perform a feed-back control.

On the other hand, in the Patent document 1 as cited above, there is disclosed an embodiment of the apparatus which is provided with the electromagnetic linear actuator to be moved linearly, between the stabilizer bars and suspension members. However, any other practical examples of the actuator have not been disclosed. Particularly, it is silent about the actuator having the electric motor and the step-down gear as disclosed in the Patent document 2. However, in the case where the output from the electric motor is transmitted via a speed reducing mechanism, as described in the Patent document 2, a problem may be caused as follows. That is, the speed reducing mechanism provided for the above actuator has a normal efficiency for transmitting the power from the electric motor to the vehicle body, and a reverse efficiency for transmitting the power from the vehicle body to the electric motor. Due to the efficiency (normal efficiency and reverse efficiency) of the speed reducing mechanism, if the active roll moment is provided for the roll restraining control on the basis of a lateral acceleration (actual lateral acceleration, or calculated lateral acceleration), the rolling motion may not be converged appropriately.

Therefore, according to the present invention, in a stabilizer control apparatus provided with an actuator having an electric motor and a speed reducing mechanism to transmit a power through the speed reducing mechanism, it is an object of the present invention to restrain a rolling motion of a vehicle body smoothly and rapidly, without being affected by a transmitting efficiency of the speed reducing mechanism.

Means for Solving the Problems

To solve the above-mentioned problems, according to the present invention, in a stabilizer control apparatus comprising a stabilizer including a pair of stabilizer bars disposed between a right wheel and a left wheel of a vehicle, and an actuator having an electric motor and a speed reducing mechanism, and disposed between said pair of stabilizer bars, and control means for controlling said electric motor in response to a turning state of said vehicle, to control a torsional rigidity of said stabilizer, the apparatus comprises relative position detection means for detecting a relative position of said pair of stabilizer bars, and it is so constituted that said control means controls said electric motor in response to the detected result of said relative position detection means.

As for the turning state, a decreased turning state represents such a state that a turning level of a vehicle (which can be represented by a lateral acceleration) decreases to approximate to a straight traveling. Also, such a state that the turning level of the vehicle is held to be constant, is called as a holding turning state, and such a state that the turning level of the vehicle increases, is called as an increased turning state, hereinafter.

Said relative position detection means may include a rotational angle sensor for detecting a rotational angle of said electric motor. In this case, it can be so constituted that said control means sets a desired value for the relative position of said pair of stabilizer bars, calculates a desired rotational angle of said electric motor on the basis of said desired value, and controls said electric motor according to a PID control on the basis of a deviation between said desired rotational angle and the rotational angle detected by said rotational angle sensor. The relative position detection means may be constituted by installing a relative position sensor in the actuator.

EFFECTS OF THE INVENTION

Consequently, according to the stabilizer control apparatus of the present invention, it is so constituted that the electric motor is controlled in response to the detected result of relative position detection means for detecting a relative position of a pair of stabilizer bars. Therefore, the rolling motion of the vehicle body can be restrained smoothly and rapidly, without being affected by the transmitting efficiency of the speed reducing mechanism.

In the above-described stabilizer control apparatus, the relative position detection means can be constituted by a rotational angle sensor, so that the electric motor can be controlled appropriately on the basis of the deviation between the detected rotational angle and the desired rotational angle.

DESCRIPTION OF CHARACTERS

SBf: front stabilizer
SBfr, SBfl: front stabilizer bar
SBr: rear stabilizer
FT,RT: stabilizer actuator
SW: steering wheel
SA: steering angle sensor
WHfr, WHfl, WHrr, WHrl: vehicle wheel
WSfr, WSfl, WSrr, WSrl: wheel speed sensor
YR: yaw rate sensor
XG: longitudinal acceleration sensor
YG: lateral acceleration sensor
ECU: electronic controller

BEST MODE FOR CARRYING OUT THE INVENTION

Figure 1:
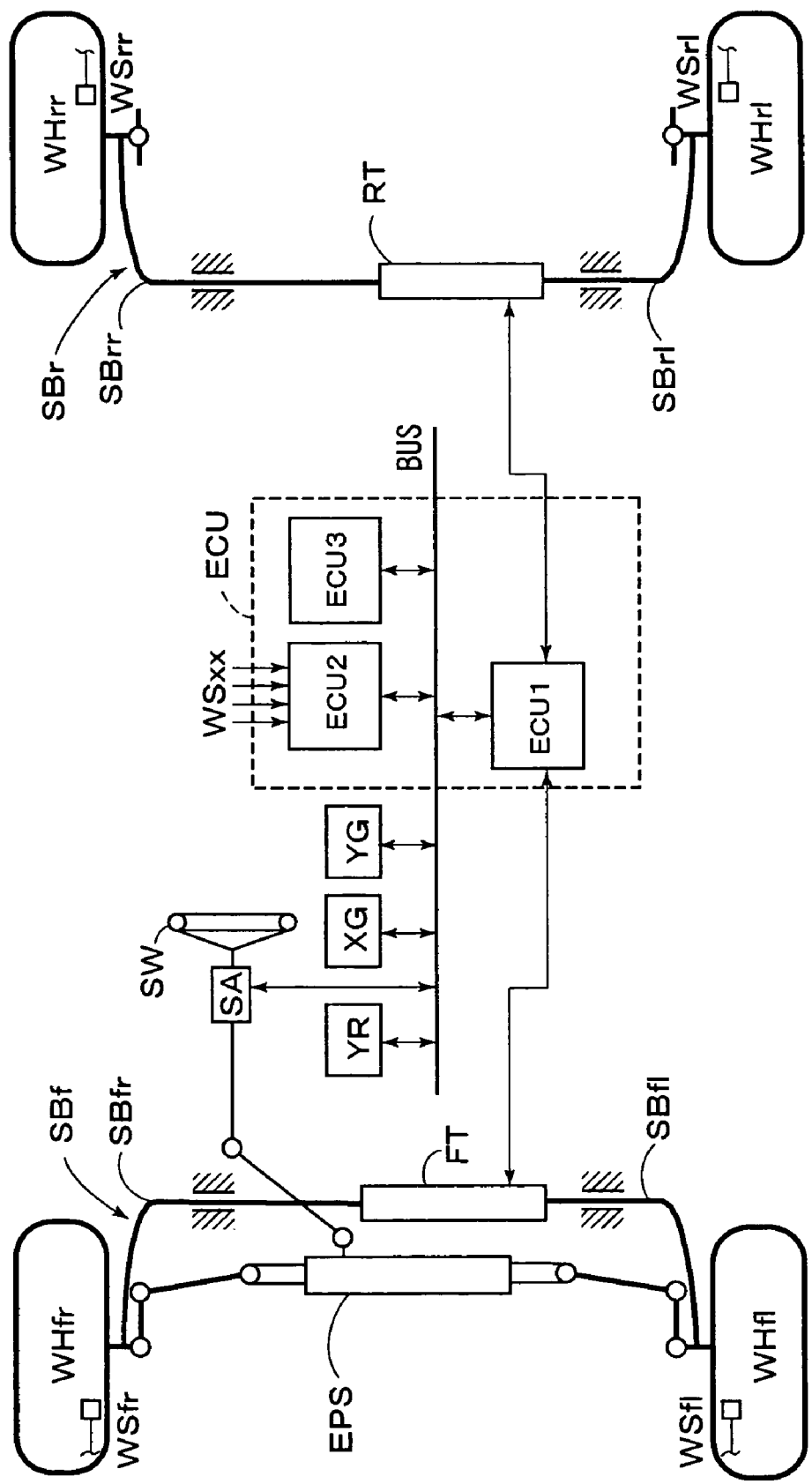
FIG. 1 is a schematic structural figure of a vehicle having a stabilizer control apparatus according to an embodiment of the present invention.

Hereinafter, will be explained a desirable embodiment of the present invention. In FIG. 1, there is shown overall structure of a vehicle with a stabilizer control apparatus according to an embodiment of the present invention. A front stabilizer SBf and a rear stabilizer SBr are disposed to act as a torsion spring when a motion in a rolling direction is applied to a vehicle body (not shown). As for the front stabilizer SBf and rear stabilizer SBr, each torsional rigidity of them is adapted to be controlled by stabilizer actuators FT and RT to be varied, so as to restrain a roll angle of the vehicle body resulted from the rolling motion of the vehicle body. The stabilizer actuators FT and RT are controlled by a stabilizer control unit ECU1 provided in an electronic controller ECU.

As shown in FIG. 1, at each wheel WHxx of the vehicle, there is provided a wheel speed sensor WSxx ("xx" designates each wheel, i.e., "fr" designates the wheel at the front right side, "fl" designates the wheel at the front left side, "rr"

designates the wheel at the rear right side, and "rl" designates the wheel at the rear left side), which is connected to the electronic controller ECU, and by which a signal having pulses proportional to a rotational speed of each wheel, i.e., a wheel speed, is fed to the electronic controller ECU. Furthermore, a steering angle sensor SA for detecting a steering angle (handle angle) δf of a steering wheel SW, a longitudinal acceleration sensor XG for detecting a longitudinal acceleration Gx of the vehicle, a lateral acceleration sensor YG for detecting a lateral acceleration Gy of the vehicle, a yaw rate sensor YR for detecting a yaw rate Yr of the vehicle, and the like are electrically connected to the electronic controller ECU.

In the electronic controller ECU, in addition to the stabilizer control unit ECU1 as described above, a brake control unit ECU2, steering control unit ECU3 and the like are constituted, and these control units ECU1-3 are connected to a communication bus, through a communication unit (not shown) provided with CPU, ROM and RAM for communication. Therefore, the information required for each control system can be fed from other control systems.

Figure 2:
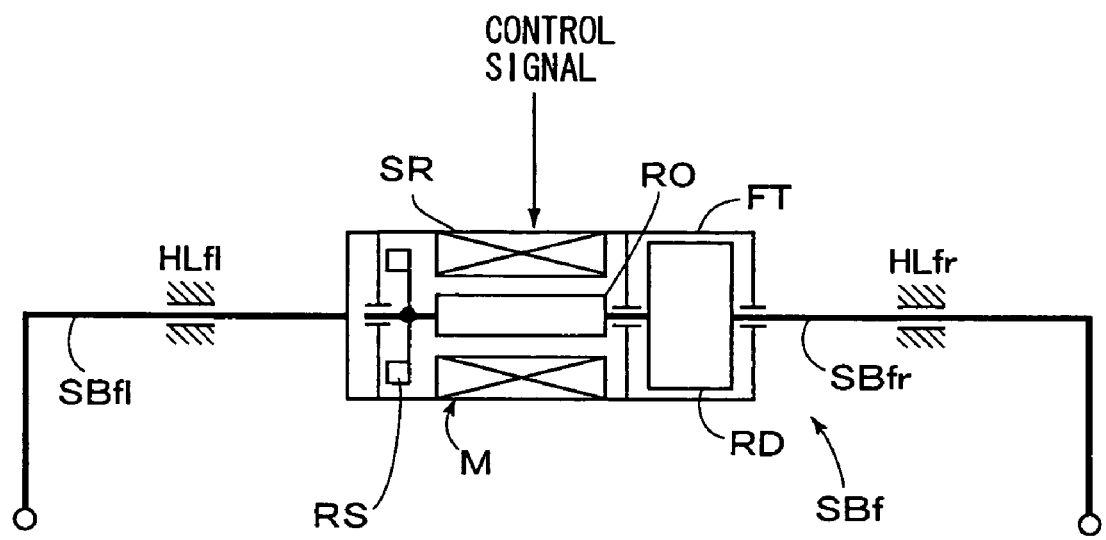
FIG. 2 is a structural figure showing a practical structural example of a stabilizer actuator according to an embodiment of the present invention.

FIG. 2 shows a practical constitutional example of the stabilizer actuator FT (also, RT is constituted in the same manner), wherein the front stabilizer SBf is divided into a pair of right and left stabilizer bars SBfr and SBfl, one end of each bar is connected to a right or left wheel, and the other end of one bar is connected to a rotor RO of an electric motor M through a speed reducing mechanism RD, and the other end of the other one bar is connected to a stator SR of the electric motor M. The stabilizer bars SBfr and SBfl are held on the vehicle body by holding members HLfr and HLfl. Consequently, when the electric motor M is energized, torsional force is created on each of the divided stabilizer bars SBfr and SBfl, so that apparent torsion spring characteristic of the front stabilizer SBf is changed, whereby the roll rigidity of the vehicle body is controlled. A rotational angle sensor RS is disposed in the stabilizer actuator FT, to act as rotational angle detection means for detecting a rotational angle of the electric motor M.

Figure 3:
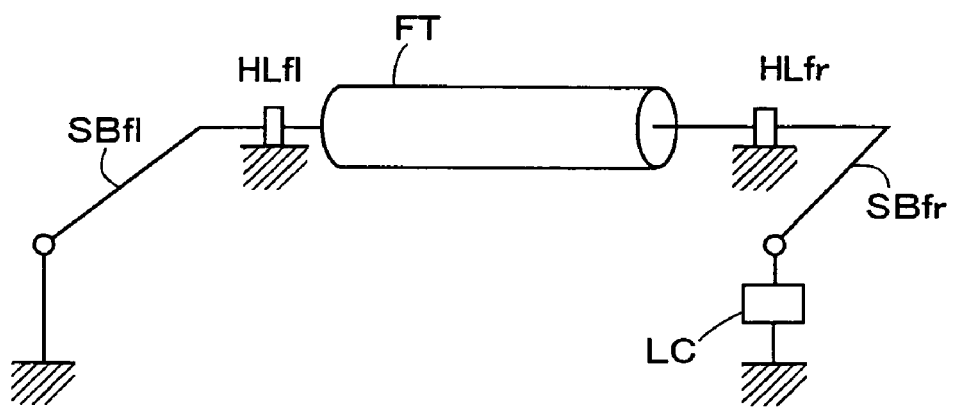
FIG. 3 is a structural figure showing an example of a testing device of a stabilizer actuator for use in an embodiment of the present invention.

Herein, will be explained a background of the present invention as described before, referring to FIGS. 3-7 in more detail. The stabilizer control apparatus according to the present invention is provided with the stabilizer actuator for making the power transmission through the speed reducing mechanism RD, with the electric motor M used as a power source, and the speed reducing mechanism RD has a normal efficiency and a reverse efficiency. For example, as shown in FIG. 3, the divided stabilizer bars SBfr and SBfl are fixed to the aforementioned stabilizer actuator FT as shown in FIG. 2, and electric current Im fed to the electric motor M for driving the stabilizer actuator FT is measured, and then its load is measured by a load cell LC. In this case, the stabilizer bars SBfr and SBfl are supported by holding members HLfr and HLfl. As the electric current Im for driving the above-described electric motor M has an approximately proportional relationship with the motor torque output, it is a value corresponding to the output of the electric motor M, and the output (measured value) of the load cell LC is a value corresponding to the roll moment created by the stabilizer bars SBfr and SBfl.

Figure 4:
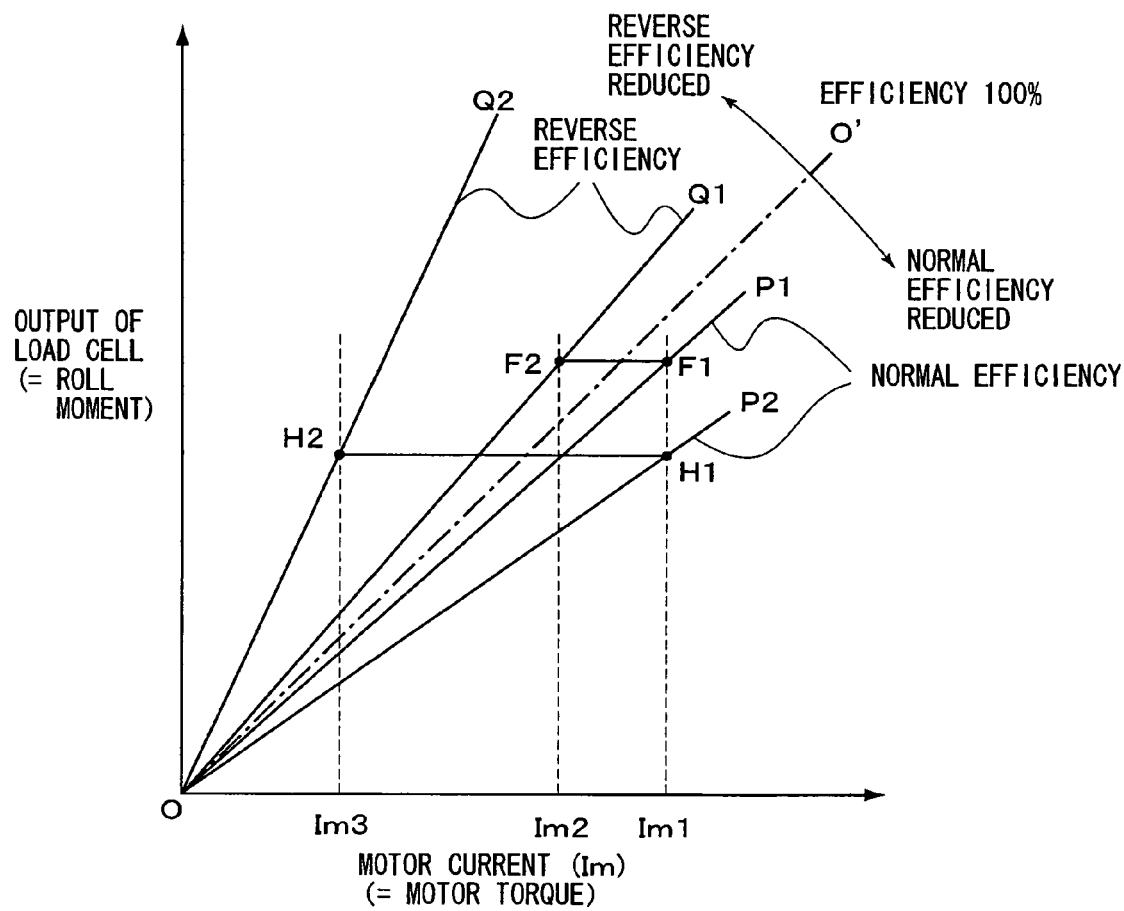
FIG. 4 is a graph showing an example of a relationship between a driving current of an electric motor and a rolling moment, with respect to a testing result by the testing device as shown in FIG. 3.

Referring to FIG. 4, the characteristic of the stabilizer actuator FT measured by the testing device as shown in FIG. 3 will be explained hereinafter. In FIG. 4, an origin (0) is indicated by "O", a reference line of efficiency 100% is indicated by a line segment O-O'. Herein, the efficiency 100% means that both of the normal efficiency and the reverse efficiency of the stabilizer actuator FT are 100%, so that if X-axis and Y-axis are indicated by the same dimension, it will be a characteristic with a gradient of "1". And, a range surrounded by the X-axis and the line segment O-O' indicates the normal efficiency with the electric motor M applying a torsion to the stabilizer bars SBfr and SBfl. Herein, if the X-axis and Y-axis are indicated by the same dimension, in the same manner as in the characteristic of efficiency 100%, the normal efficiency is indicated by a characteristic with a gradient of "ηP". On the other hand, the reverse efficiency is a range surrounded by the Y-axis and the line segment O-O'. If the reverse efficiency is indicated by "ηN" in the same manner as described above, the relationship between the input and the output is opposite to the above-described characteristic, so that it is indicated by a characteristic with a gradient of "1/ηN" on the X-Y coordinates in FIG. 4. Therefore, supposing that the speed reducing mechanism with low normal efficiency and reverse efficiency is employed, for example, their characteristics will be the ones with the efficiencies getting remote from the efficiency 100% (line segment O-O') in the X-axis direction and Y-axis direction. In FIG. 4, one example with high normal efficiency and reverse efficiency is indicated by line segments O-P1 and O-Q1, whereas one example with low normal efficiency and reverse efficiency is indicated by line segments O-P2 and O-Q2.

Then, in the case where the driving current Im fed to the electric motor M was gradually increased from the zero point (origin "O") to the current Im1, and then it was gradually decreased to the zero point again, the following characteristic is obtained. That is, in the case where the efficiency of the speed reducing mechanism RD is relatively high so that its normal efficiency is indicated by the characteristic of O-P1 and its reverse efficiency is indicated by the characteristic of O-Q1, if the electric current Im for driving the motor is increased from zero to the electric current Im1, then the output of the load cell LC is generated to provide such a characteristic that extends from the origin "O" to a point F1 along the normal efficiency characteristic O-P1. Thereafter, if the electric current Im for driving the motor is decreased from the current Im1 to zero, then the load cell LC outputs along the reverse efficiency characteristic O-Q1. When the normal efficiency characteristic O-P1 is shifted to the reverse efficiency characteristic O-Q1, however, the electric motor M is placed in a locked state due to power balance, to provide a range of F1-F2. Then, the electric motor M begins to be retracted by means of the torsional force that is created by the stabilizer bars SBfr and SBfl, at the inter section F2 of the reverse efficiency characteristic O-Q1 and the electric current Im2 for driving the motor. Therefore, if the electric current Im for driving the motor is increased from zero to the current Im1, then reduced to zero (origin "O"), a characteristic of O-F1-F2-O as shown in FIG. 4 will be obtained.

On the other hand, in the case where the efficiency of the speed reducing mechanism RD is low, the output of the load cell LC to variation of the above-described electric current Im for driving the motor indicates a characteristic of O-H1-H2-O. Thus, in the case where the efficiency of the speed reducing mechanism RD is low, not only the output of the stabilizer actuator FT is low relative to the input of the electric current Im for driving the motor, but also the locked state of the motor exists in a wide range of the electric current Im for driving the motor (range of H1-H2) will be the problems to be solved. In the latter case, the electric motor M will not be retracted by the outer force created by the stabilizer bars SBfr and SBfl, until the electric current Im for driving the motor will reach the current Im3, whereby the locked states of the stabilizer bars SBfr and SBfl will be maintained.

Figure 5:
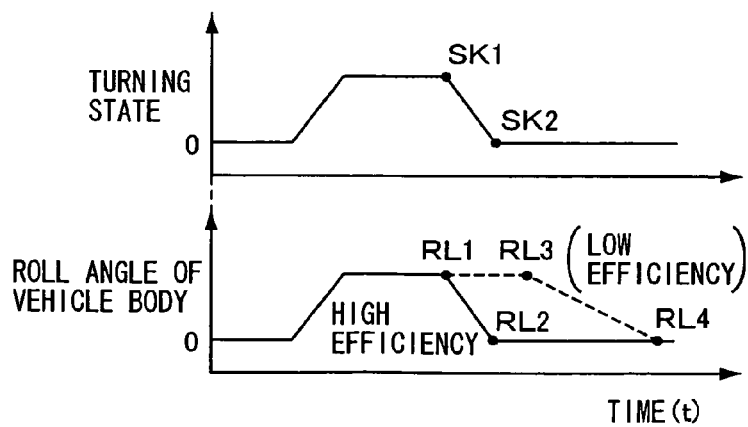
FIG. 5 is a graph showing an example of a relationship between a turning state of a vehicle and a roll angle of vehicle body according to an embodiment of the present invention.

The characteristic of the stabilizer actuator FT as shown in FIG. 4 might affect an actual vehicle performance, as described hereinafter. For example, in the case where the efficiency (normal efficiency and reverse efficiency) of the speed reducing mechanism RD is high, it provides a good responsibility, and it can achieve an appropriate control of the roll angle of the vehicle body in response to change in turning state, to provide a characteristic of RL1-RL2 as shown in FIG. 5. However, in the case where the efficiency of the speed reducing mechanism RD is low, the characteristic might become to be the one as indicated by a broken line in FIG. 5. That is, although the vehicle has been returned to its straight traveling state SK2 from its turning state SK1, as shown in the upper section in FIG. 5, the roll angle of the vehicle body is remained (characteristic of RL1-RL3 in FIG. 5). Also, as shown in the characteristic indicated by RL3-RL4 in FIG. 5, the convergence of the roll angle of the vehicle body will not be made rapidly, so that the roll convergence speed will be delayed, comparing with the characteristic of RL1-RL2.

The above-described problem is resulted from what the object to be controlled employs the force (motor output). As apparent from FIG. 4, as the characteristic is different between the one for transmitting the force and the one with the force being transmitted, two outputs (roll moment) are provided for one input (motor output) in the characteristics of the normal efficiency and reverse efficiency of the speed reducing mechanism RD, so that determination for each case is required. Furthermore, when the force transmitting direction is changed, the object to be controlled (output) has a discontinuous characteristic, so that a compensation for it is required. Therefore, according to the present invention, even if the electric motor M is changed between the one for transmitting the force (driving side) and the one with the force being transmitted (driven side), the electric motor control without being affected by the efficiency characteristic of the speed reducing mechanism RD can be achieved, by use of the object to be controlled having a continuous characteristic.

Figure 6:
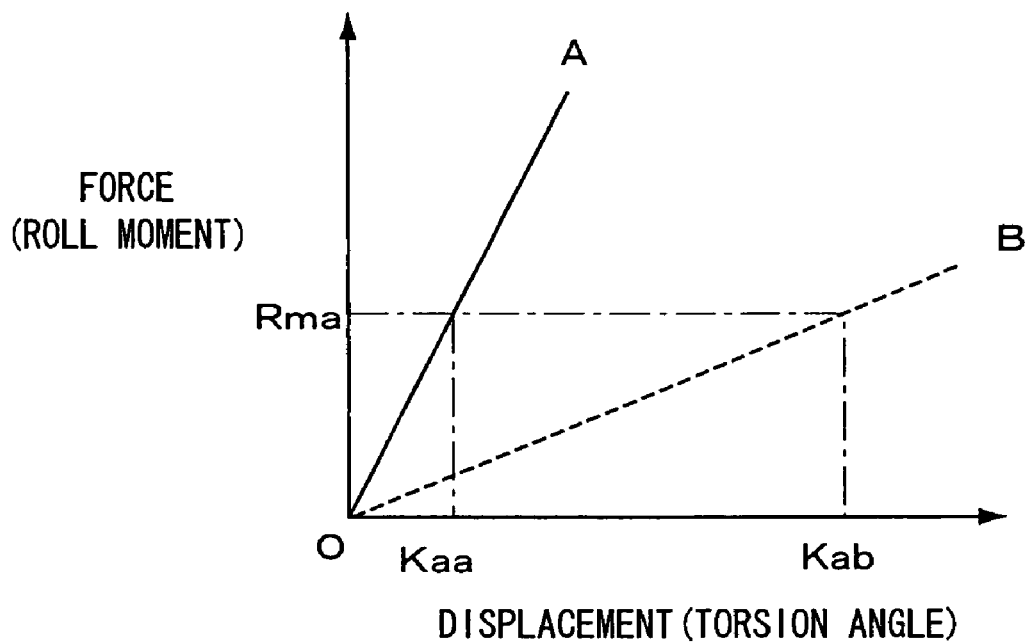
FIG. 6 is a graph showing an example of a relationship between a displacement of a stabilizer bar and a force (roll moment) according to an embodiment of the present invention.

FIG. 6 shows a torsional rigidity of the stabilizer control apparatus in the active roll restraining control. A characteristic O-B of broken line in FIG. 6 indicates the original torsional rigidity of the stabilizer bars SBfr and SBfl (the torsional rigidity of a pair of stabilizer bars SBfr and SBfl in their fixed states) divided into two portions as shown in FIG. 2. On the other hand, the stabilizer control apparatus requires such a torsional rigidity characteristic O-A as to produce a force (roll moment) Rma required for restraining the roll angle of the vehicle body at a displacement Kaa. However, in order to produce the roll moment Rma with the original torsional rigidity of the stabilizer bars, a displacement Kab is required.

Therefore, in the stabilizer actuator FT as shown in FIG. 2, a relative displacement (Kab-Kaa) is provided by the electric motor M for the stabilizer bars SBfr and SBfl, whereby the roll moment Rma can be obtained, even if the displacement Kaa is caused by the stabilizer control apparatus as a whole. Thus, by providing the relative displacement between the pair of stabilizer bars SBfr and SBfl, the torsional rigidity for the stabilizer control apparatus as a whole can be set as the characteristic O-A.

Figure 7:
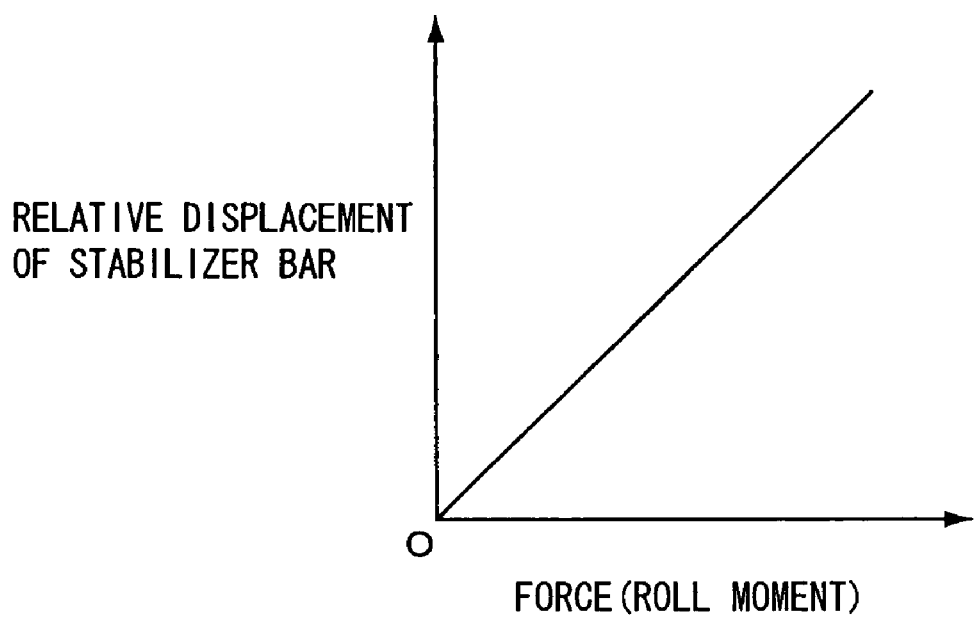
FIG. 7 is a graph showing an example of a relationship between a force (roll moment) required for restraining a roll angle and a relative displacement of a stabilizer bar according to an embodiment of the present invention.

The relationship between the force (roll moment) Rma required for restraining the roll angle and the relative displacement of the stabilizer bars SBfr and SBfl corresponds to each other with one-to-one, as shown in FIG. 7. If the torsional rigidity characteristics of the stabilizer bars SBfr and SBfl indicate the linear characteristic, the aforementioned relationship will be linear. Therefore, with the electric motor M being controlled on the basis of the relative position of the pair of stabilizer bars SBfr and SBfl, in accordance with the vehicle turning state, the output variation and its discontinuity resulted from the aforementioned efficiency (normal efficiency and reverse efficiency) of the speed reducing mechanism can be cancelled. And, even if the electric motor M for driving the stabilizer bars SBfr and SBfl is changed between the driving side and the driven side, a smooth and rapid control can be achieved.

Figure 8:
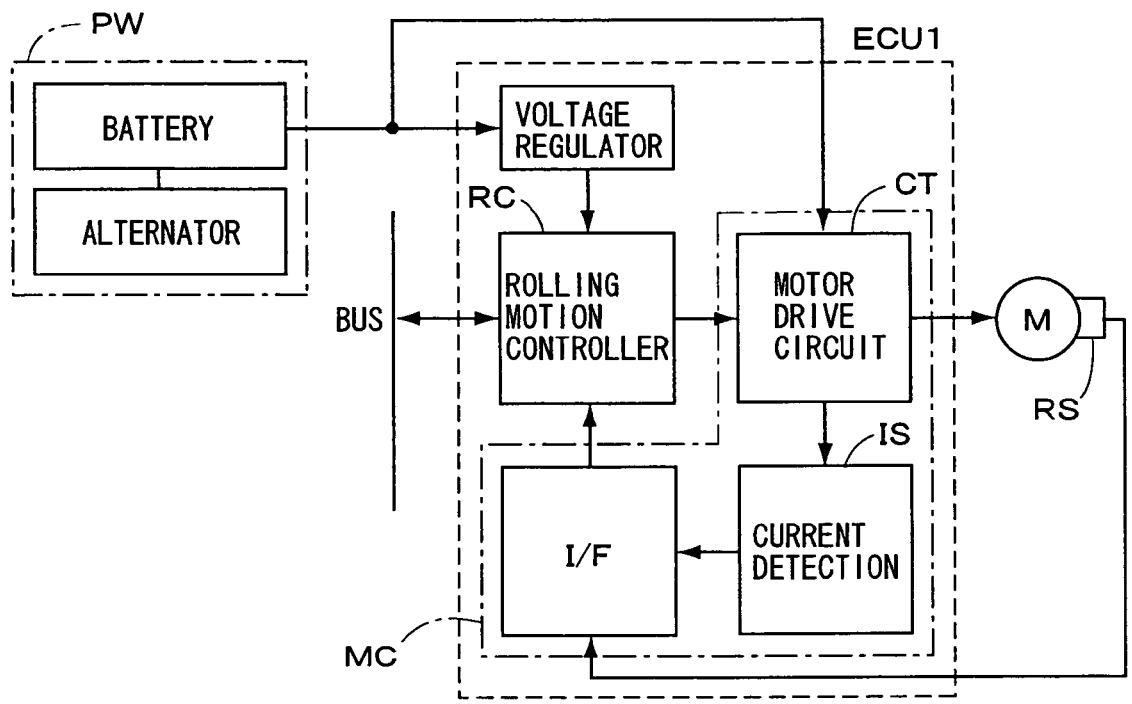
FIG. 8 is a structural figure showing an example of a stabilizer control unit according to an embodiment of the present invention.

The electric motor M constituting the aforementioned stabilizer actuator FT is constituted as shown in FIG. 8 for example, and controlled by the stabilizer control unit ECU1. According to the stabilizer control unit ECU1 of the present embodiment, the voltage fed to the electric motor M by a motor drive circuit CT is regulated by a rolling motion controller RC. In this case, the electric current of the motor drive circuit CT is detected by a current detection block IS, and fed back to the rolling motion controller RC through an interface I/F, together with the rotational angle signal of the electric motor M detected by the rotational angle sensor RS. The controller RC and motor drive circuit CT are connected to a power source PW. According to the present embodiment, a three-phase brushless motor is used for the electric motor M, while the electric motor M is not limited to it, but may be used by a motor having other number of phases, even by a brush motor.

Figure 9:
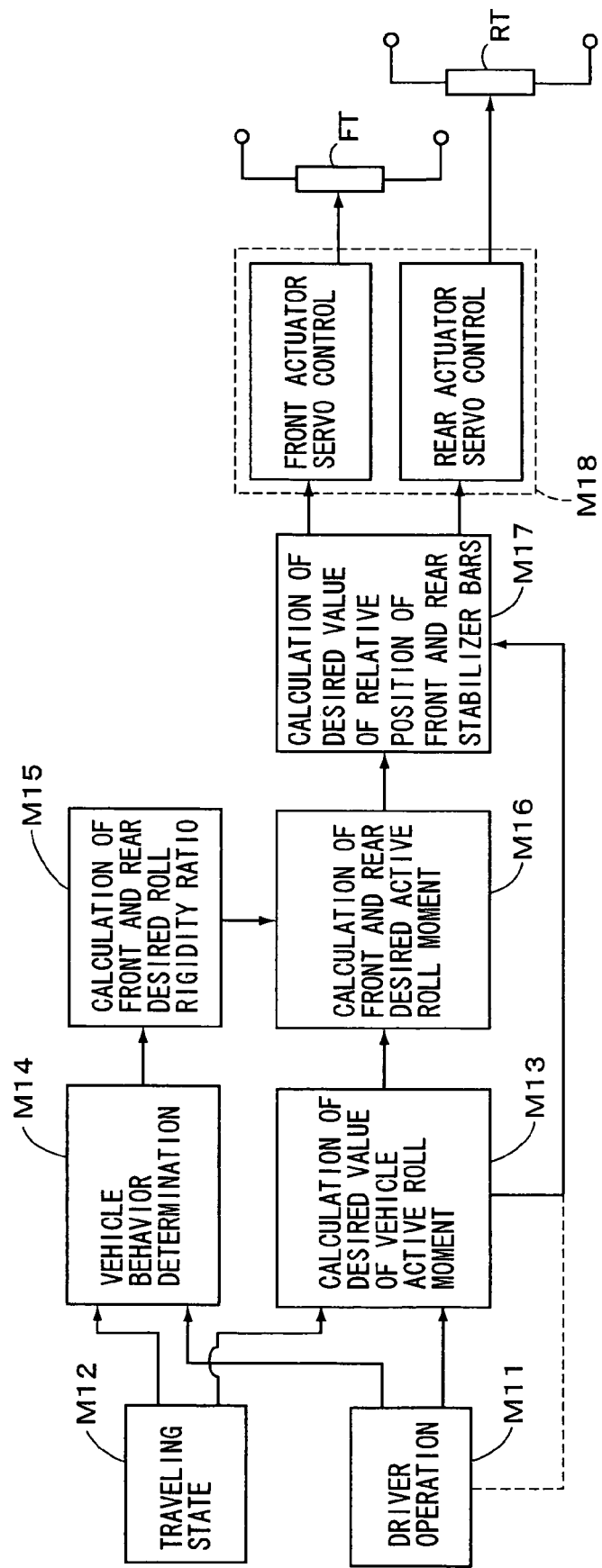
FIG. 9 is a control block diagram showing an outline of an active roll restraining control according to an embodiment of the present invention.

FIG. 9 shows a control block for the active roll restraining control, wherein the information including the steering angle (handle angle) $\delta f$ is detected by vehicle driver operation detection means M11, and wherein vehicle motion variable including the vehicle speed, lateral acceleration and yaw rate are detected by vehicle traveling state detection means M12. On the basis of the detected information, a desired value of vehicle active roll moment is calculated (M13) to achieve a desired rolling characteristic of the vehicle. Also, at a vehicle behavior determination block M14, vehicle steering characteristic (so-called understeer tendency or oversteer tendency) is determined on the basis of the steering operation by the vehicle driver and the vehicle motion variable. Next, the desired values of the front and rear roll rigidity ratios are calculated (M15) on the basis of the calculated steering characteristic and the vehicle motion variable. Based on the desired values of vehicle active roll moment and the roll rigidity ratios as obtained above, the desired values of active roll moment for the front and rear wheels are calculated (M16). Then, based on these desired values, converting calculation is made to provide the desired value of relative position of the stabilizer bar (M17), on the basis of which the stabilizer actuators FT and RT are controlled by the actuator servo block (M18).

Figure 10:
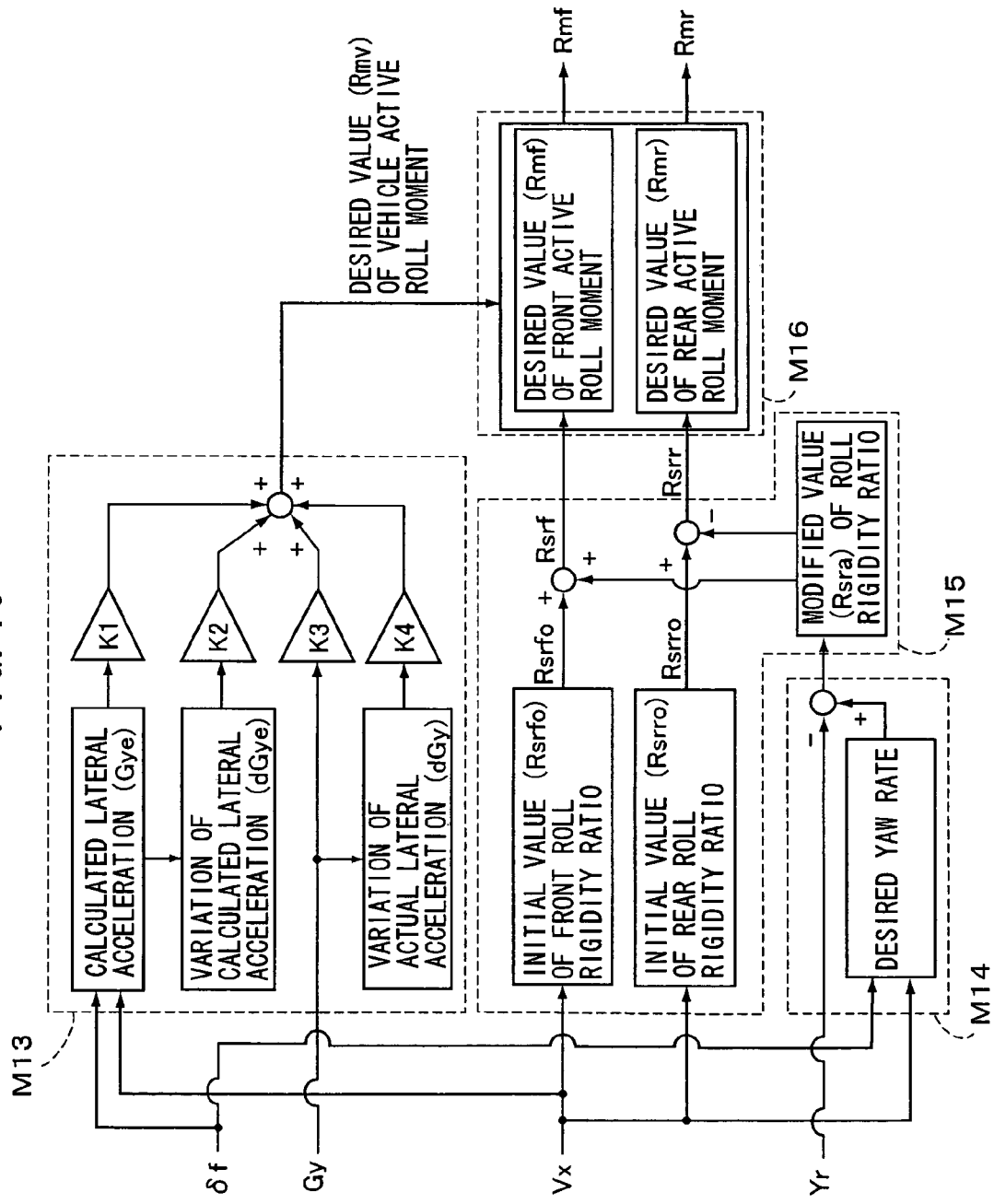
FIG. 10 is a control block diagram of an embodiment of the active roll restraining control as shown in FIG. 9.

FIG. 10 shows a more practical embodiment of the embodiment as shown in FIG. 9, wherein a desired value Rmv of vehicle active roll moment for restraining the rolling motion of the vehicle as a whole is calculated at the desired value of vehicle active roll moment calculation block M13, on the basis of the lateral acceleration Gy detected by the lateral acceleration sensor YG, the variation of the actual lateral acceleration dGy obtained by differentiating the lateral acceleration Gy, the calculated lateral acceleration Gye calculated by the handle angle (steering angle) $\delta f$ and vehicle speed Vx, and the variation of the calculated lateral acceleration dGye obtained by differentiating the calculated lateral acceleration Gye. The calculated lateral acceleration Gye can be obtained by the following equation (1).

$$Gye=(Vx^2 \cdot \delta f)/\{L \cdot N \cdot (1+Kh \cdot Vx^2)\} \tag{1}$$

where "L" is a wheel base, "N" is a steering gear ratio, and "Kh" is a stability factor.

Consequently, the desired value (Rmv) of active roll moment to be applied to the vehicle as a whole so as to achieve an appropriate rolling characteristic can be obtained by the following equation (2) (K1, K2, K3, K4 are control gains).

$$Rmv = K1 \cdot Gye + K2 \cdot dGye + K3Gy + K4 \cdot dGy \qquad (2)$$

As described above, the calculated lateral acceleration Gye obtained by the steering angle δf and vehicle speed Vx, and its variation dGye are taken into consideration, so as to compensate a delay in calculation or responsibility of the actuator.

Figure 11:
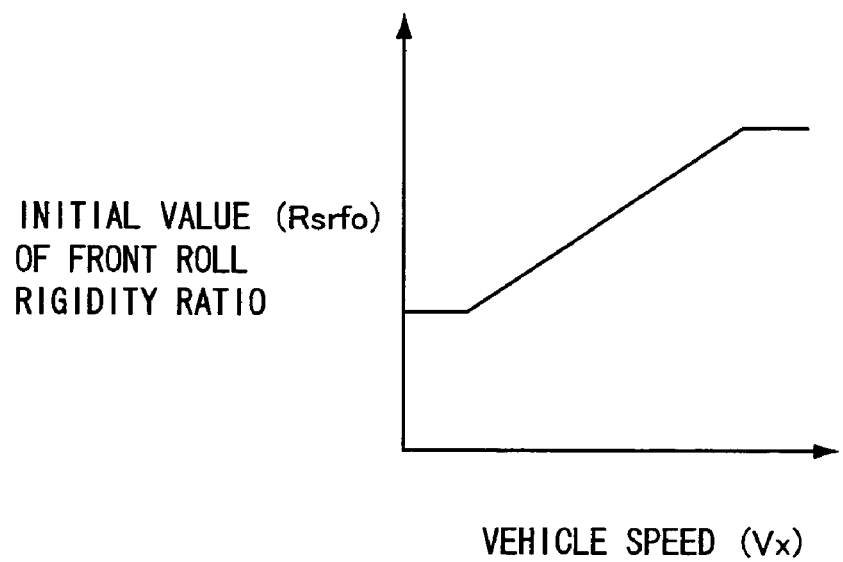
FIG. 11 is a graph showing an example of a map for setting an initial value of a front roll rigidity ratio according to an embodiment of the present invention.

At the front and rear roll rigidity ratio calculation block M15, the desired values of the front and rear roll rigidity ratios are calculated as follows. At the outset, the initial values Rsrfo and Rsrro are set for the front roll rigidity ratio and rear roll rigidity ratio, respectively, on the basis of the vehicle speed Vx. As shown in FIG. 11, the initial value Rsrfo for the front roll rigidity ratio is set to be low when the vehicle is traveling at low speed, whereas it is set to be high when the vehicle is traveling at high speed, thereby to increase the understeer tendency when the vehicle is traveling at high speed. Then, the initial value Rsrro for the rear roll rigidity ratio is set to be (1-Rsrfo). Next, at a vehicle behavior determination block M14, a desired yaw rate Yre is calculated on the basis of the steering angle δf and vehicle speed Vx, to determine the vehicle steering characteristic, and then compared with the actual yaw rate Yr to calculate a yaw rate deviation ΔYr, on the basis of which a modified value Rsra for the roll rigidity ratio is calculated.

As a result, when the vehicle shows the understeer tendency, the front roll rigidity ratio is modified to be decreased, and the rear roll rigidity ratio is modified to be increased. On the contrary, when the vehicle shows the oversteer tendency, the front roll rigidity ratio is modified to be increased, and the rear roll rigidity ratio is modified to be decreased. Then, in a front and rear wheel desired active roll moment value calculation block M16, the desired value Rmf of active roll moment for the front wheel and the desired value Rmr of active roll moment for the rear wheel are calculated, on the basis of the desired value Rmv of vehicle active roll moment, the desired value Rsrf of the front roll rigidity ratio, and the desired value Rsrr of the rear roll rigidity ratio, in accordance with the equations of Rmf=Rmv·Rsrf and Rmr=Rmv·Rsrr, respectively.

Figure 12:
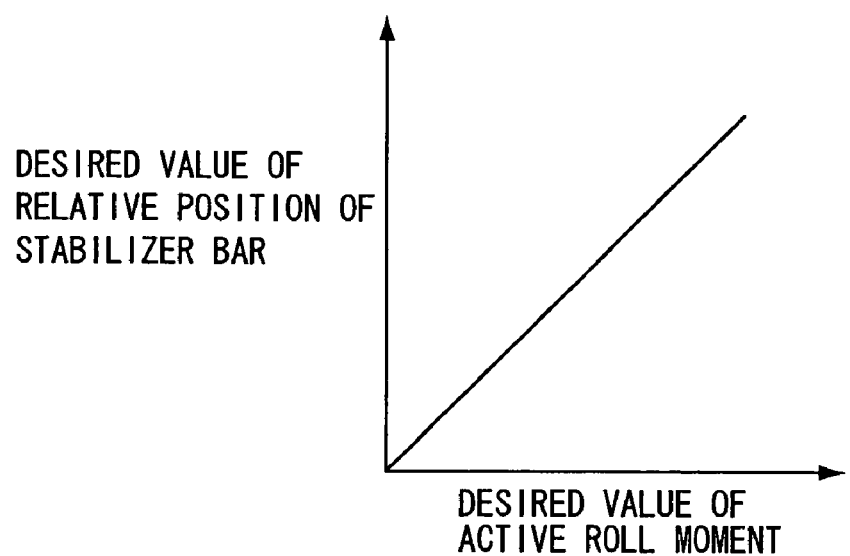
FIG. 12 is a graph showing an example of a map for setting a desired value of relative position of a stabilizer bar according to an embodiment of the present invention.

Next, on the basis of the desired values Rmf and Rmr of active roll moments of front and rear wheels, the desired values Psf and Psr of relative positions of the stabilizer bars of front and rear wheels are set as shown in FIG. 12. As the torsional rigidity of the stabilizer bars SBfr and SBfl of front and rear wheels have already been known, if it has a linear characteristic, the desired values Psf and Psr of relative positions of the stabilizer bars of front and rear wheels are determined according to the relationships of Psf=K5·Rmf, Psr=K6·Rmr, respectively (in FIG. 12), wherein K5 and K6 are coefficients for converting the active roll moment amount into the relative positions of the stabilizer bars, which are the values with the torginal rigidity of the stabilizer bars SBfr and SBfl, suspension geometry or the like, taken into consideration. If the stabilizer bars SBfr and SBfl have non-linear characteristics, a preset map may be used.

Figure 13:
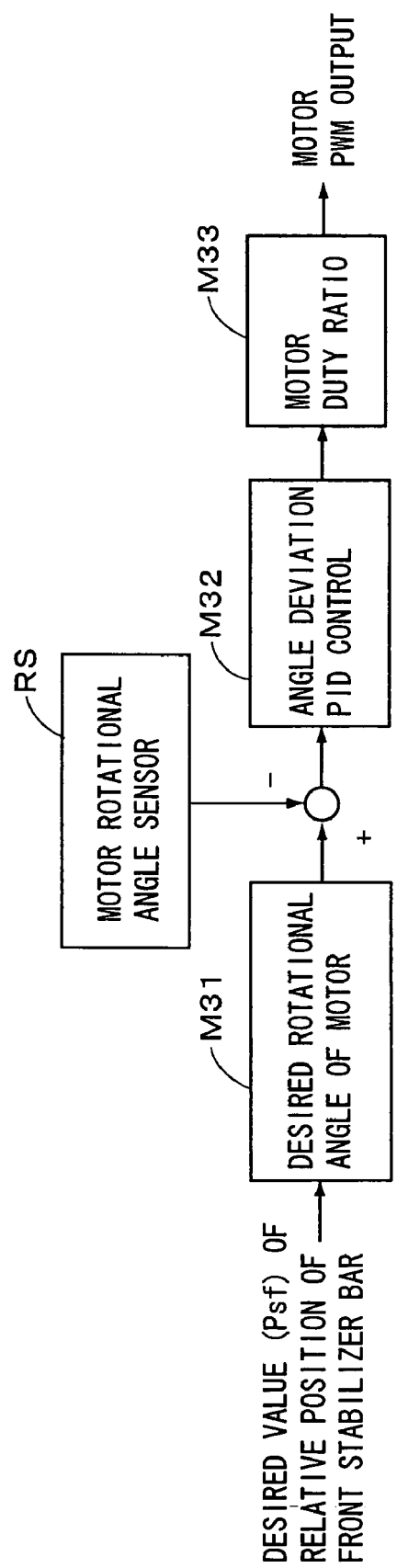
FIG. 13 is a control block diagram of an embodiment of a motor control according to an embodiment of the present invention.

Next, will be explained the actuator servo control based on the desired values Psf and Psr of relative positions of the stabilizer bars as set in the above. FIG. 13 shows a control block of the actuator servo control for the front wheels, and the control for the rear wheels is the same. A desired rotational angle θt for the electric motor M is calculated (M31), on the basis of the desired value Psf of relative position of the stabilizer bar of the front wheel, taking the reducing speed ratio of the actuator FT into consideration. A deviation Δθ (=θt−θa) between the desired rotational angle θt and an actual rotational angle θa obtained by the rotational angle sensor RS mounted on the electric motor M is calculated. Then, on the basis of the rotational angle deviation Δθ, a PID control is executed (M32), and a duty ratio DT for driving and controlling the electric motor M is set (M33).

This duty ratio DT is calculated according to the following equation (3).

$$DT = Kp\Delta\theta + Kd \cdot d(\Delta\theta)/dt + Ki \cdot \int \Delta\theta dt \qquad (3)$$

where Kp is a proportional gain, Kd is a differential gain, Ki is an integral gain. Based on the duty ratio DT, PWM output is fed to the electric motor M. In FIG. 13, the relative positions of the stabilizer bars SBfr and SBfl are obtained on the basis of the relationship between the rotational angle and reducing speed ratio of the electric motor M, to constitute the relative position detection means, whereas it can be constituted by providing a relative position sensor different from the rotational angle of the electric motor M.

Figure 14:
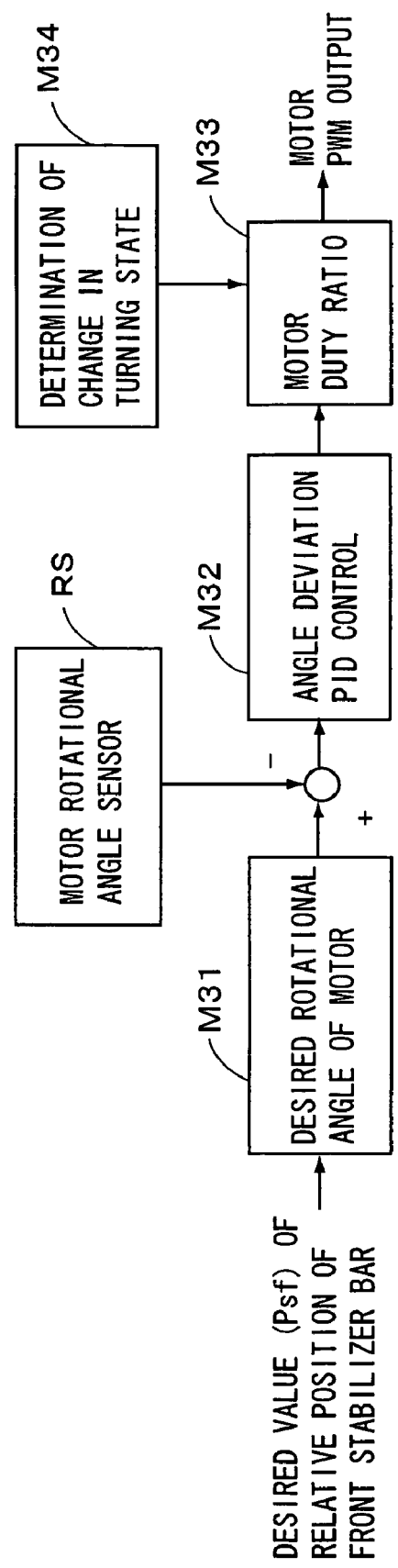
FIG. 14 is a control block diagram of another embodiment of a motor control according to an embodiment of the present invention.

The motor duty ratio DT can be set on the basis of a direction of change in turning state as shown in FIG. 14. Herein, as the variation of the rolling motion of the vehicle body is resulted from the variation of the turning state, the variation of the turning state can be replaced by the variation of the rolling motion. And, a determination (M34) of the direction of change in turning state, which is added in FIG. 14, is provided for determining which one of the increased turning state, holding turning state and decreased turning state. That is, the output characteristic of the motor can be set appropriately, in the case where the motor output is output in a direction for opposing the inertia force acting on the vehicle body, and the case where the motor output is output in the same direction as the inertia force. As explained with reference to FIG. 13, the duty ratio DT is calculated as DT=Kp·Δθ +Kd·d(Δθ)/dt +Ki· ∫ Δθ dt, wherein the gains Kp, Kd and Ki have been set in advance, for each case of the increased turning state, holding turning state and decreased turning state. And, each gain is obtained in accordance with the result of determination of the direction of change in turning state, as described later.

Figure 15:
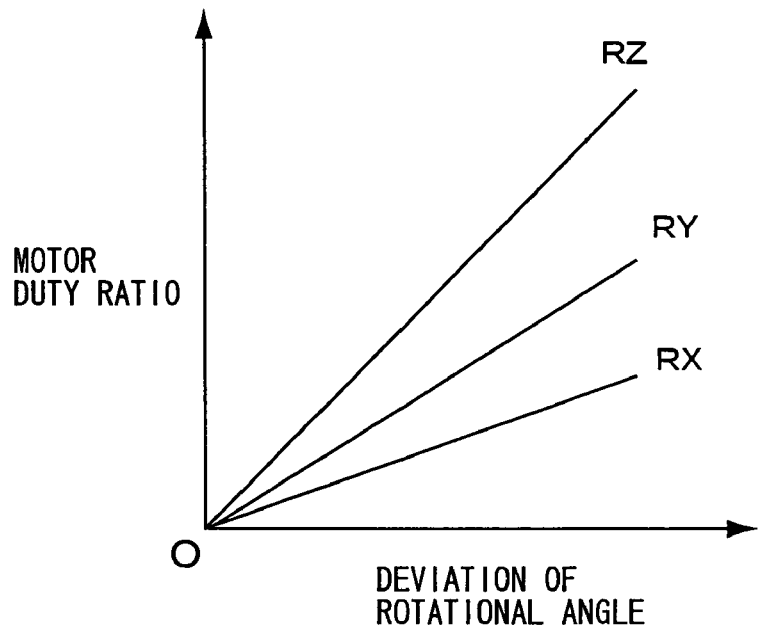
FIG. 15 is a graph showing a relationship between a rotational angle deviation and a motor duty ratio according to an embodiment of the present invention.

Consequently, the relationship between the rotational angle deviation and the motor duty ratio is determined as shown in FIG. 15. In FIG. 15, a characteristic of O-RZ is set at the time of the increased turning state, a characteristic of O-RY is set at the time of the holding turning state, and a characteristic of O-RX is set at the time of the decreased turning state. This is because a relatively large duty ratio is set to be relatively large at the time of the increased turning state to oppose the inertia force acting on the vehicle body. On the contrary, a relatively small duty ratio is set to be relatively small at the time of the decreased turning state, because the output is in the same direction as the inertia force.

In this case, a change in turning state of the vehicle including the decreased turning state is determined on the basis of the calculated lateral acceleration (Gye) and variation of the calculated lateral acceleration (variation in time) (dGye) obtained at the vehicle active roll moment desired value calculation block M13 in FIG. 10, in accordance with the following Table 1.

| No. | Gye | dGye | Determination of change in turning state |
| --- | --- | --- | --- |
| 1 | + | + | increase |
| 2 | + | − | decrease |
| 3 | + | 0 | hold |
| 4 | 0 | + | increase |
| 5 | 0 | − | increase |
| 6 | 0 | 0 | hold |
| 7 | − | + | decrease |
| 8 | − | − | increase |
| 9 | − | 0 | hold |

In the above Table 1, according to a result of combination of the calculated lateral acceleration (Gye) and variation of the calculated lateral acceleration (dGye), it is determined which one of the increased turning state, decreased turning state and holding turning state (abbreviated as "increase", "decrease" and "hold", respectively, in Table 1). That is, in the Table 1, the state where the calculated lateral acceleration (Gye) is zero, means that a condition of [−G1<Gye<G1] is fulfilled, the state where the calculated lateral acceleration (Gye) is "+", means that a condition of [Gye≧G1] is fulfilled, and the state where the calculated lateral acceleration (Gye) is "−", means that a condition of. [Gye≦−G1] is fulfilled. Also, the state where the variation of calculated lateral acceleration (dGye) is zero, means that a condition of [−G2<dGye<G2] is fulfilled, the state where the variation (dGye) is "+", means that a condition of [dGye≧ G2] is fulfilled, and the state where the variation of calculated lateral acceleration (dGye) is "−", means that a condition of [dGye≦ −G2] is fulfilled. Herein, "G1" and "G2" are constants of positive value, and provided in advance.

Although it is determined which one of the increased turning state, decreased turning state and holding turning state on the basis of the calculated lateral acceleration (Gye) and its variation (dGye) in the Table 1 as described above, it may be determined on the basis of the steering angle, variation thereof, actual lateral acceleration, variation thereof, yaw rate and variation thereof. Or, it may be determined according to the combination of those determined results.

Consequently, in the decreased turning state, the desired value (motor desired rotational angle) of the relative position of the stabilizer bar is set, and if it corresponds to the actual relative position (motor actual rotational angle), the electric current is not fed to the electric motor M. If the relative position deviation (motor rotational angle deviation) is created, the electric current is fed to the electric motor M, so as to cancel the deviation. This series of change in current feeding state may create a small variation in rolling state of the vehicle body. Therefore, as explained before in FIG. 4, in the motor locked state, by making use of what the locked state can be maintained even if the electric current fed to the electric motor M is decreased, in the case where the decreased turning state is determined according to the turning state change determination, the electric current fed to the electric motor M may be decreased, by reducing at least one or more of the proportional gain Kp, differential gain Kd and integral gain Ki as explained in FIG. 13. Although the output for cancelling the relative deviation can not be created, the stabilizer is placed in such a state as to be locked in its position. Consequently, the small variation of the rolling motion can be restrained, to hold the rolling motion.

Figure 16:
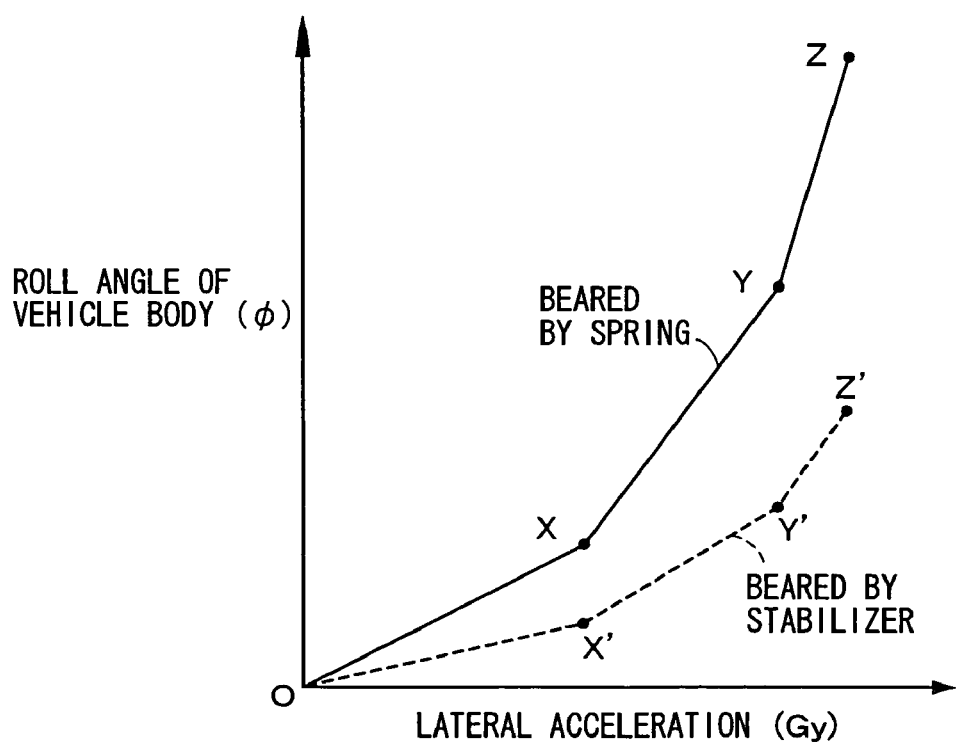
FIG. 16 is a graph showing an example of a relationship between a lateral acceleration and a roll angle of a vehicle body, in the case where output of an electric motor will not cover all ranges of an active roll restraining control according to an embodiment of the present invention.

Next will be explained about such a case that the output of the electric motor M does not cover all ranges for the active roll restraining control. In order to study a characteristic between the output of the electric motor M and the roll angle of the vehicle body, with the efficiency of the speed reducing mechanism RD being taken into consideration, there are shown in FIG. 16 a relationship between the lateral acceleration Gy (inertia force acting on the vehicle body) and roll angle φ of the vehicle body. According to a regular rolling motion, the vehicle body is supported by spring elements mounted on each wheel of the vehicle (helical spring, leaf spring, air spring or the like) and the stabilizer. As a range O-X (O designates an origin) is within a range of output of the electric motor, a torsion spring constant (may be called as a torsional rigidity) increases, then, a varying rate of the roll angle φ of the vehicle body (rolling rate) relative to the lateral acceleration Gy is reduced. In a range X-Y, the stabilizer is locked to provide such a torsional rigidity that is inherently provided on the stabilizer, i.e., the torsional rigidity provided in such a state that the stabilizer bar divided into two portions (e.g., the above-mentioned SBfr and SBfl) is fixed, on the basis of the reason as described later. Furthermore, in a range Y-Z, contrary to the range O-X, the electric motor M is rotated so as to return the torsion of the stabilizer bar by the inertia force acting on the vehicle body. Therefore, the torsional rigidity of the stabilizer decreases, whereas the roll angle of the vehicle body increases.

Figure 17:
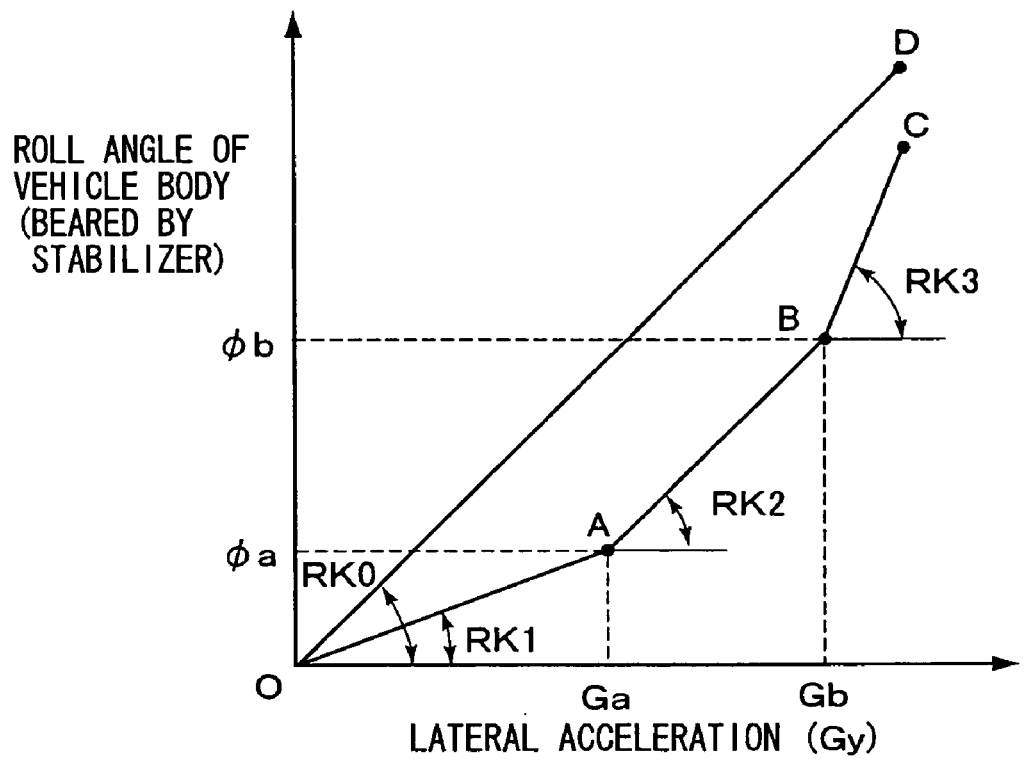
FIG. 17 is a graph showing briefly a relationship between a lateral acceleration and a roll angle of a vehicle body as shown in FIG. 16.

FIG. 17 shows the relationship between the lateral acceleration Gy and the roll angle φ of the vehicle body, which is provided for a simplified structure supported only by the stabilizer, without the above-described spring elements as shown in FIG. 16, and which is divided into three ranges. At the outset, [a range 1 with the lateral accelerations 0-Ga] corresponds to [a range capable of performing an active control of the rolling motion of the vehicle body within the range of the output of the electric motor (the range capable of performing the active roll restraining control)], so that the relationship of rolling rate is [RK1<RK0]. Next, [a range 2 with the lateral accelerations (Ga-Gb)] corresponds to [a range in which the electric motor is held and the relative displacement of the divided stabilizer bars is locked, to provide a passive characteristic of torsional rigidity for the stabilizer (the range for providing the torsional rigidity when the divided stabilizer bars are fixed)], so that the relationship of rolling rate is [RK2=RK0]. And, [a range 3 with the lateral acceleration equal to or greater than (Gb)] corresponds to [a range in which the electric motor is forced to be returned by the external force (inertia force acting on the vehicle body), to reduce the torsional rigidity of the stabilizer], so that the relationship of rolling rate is [RK3>RK0]. Herein, the rolling rate corresponds to a varying rate of the roll angle φ of the vehicle body to the lateral acceleration Gy as described above, and RK0 indicates the rolling rate for the torsion spring characteristic obtained when the divided stabilizer bars (e.g., SBfr and SBfl) are fixed.

Next will be explained a characteristic of "O-A-B-C", which is provided when the efficiency of the speed reducing mechanism RD is taken into consideration. In this case, the efficiency (normal efficiency) of the electric motor M with the power being transmitted to the stabilizer bars SBfr and SBfl through the speed reducing mechanism RD is represented by η P, whereas the efficiency (reverse efficiency) of the electric motor M, which is returned by the force input from the stabilizer bars SBfr and SBfl through the speed reducing mechanism RD, is represented by η N. With respect to a balance between the output torque Tma of the electric motor M (converted into roll moment) and a roll moment Tra resulted from the inertia force (lateral acceleration) acting on the vehicle body at the intersection A between the range 1 and the range 2, the range 1 is included in the range capable of providing the output from the electric motor M. Therefore, it is the range, in which the electric motor M transmit the power to the stabilizer bars SBfr and SBfl, to satisfy the following equation (1).

$$Tra = Tma \cdot \eta P \quad (4)$$

On the contrary, with respect to a balance between the output torque Tmb of the electric motor M (converted into a roll moment) and a roll moment Trb resulted from the inertia force (lateral acceleration) at the intersection B between the range 2 and the range 3, the range 3 is included in the range with the electric motor M returned by the inertia force of the vehicle body, to satisfy the following equation (5).

$$Trb = Tmb \cdot \eta N \quad (5)$$

With the active roll restraining control performed to restrain the roll angle of the vehicle body actively, the output torque of the electric motor M is increased in response to increase of the turning state, so as to hold the output torque of the electric motor M at the point A (output limit of the electric motor M), then the output of the electric motor M will be controlled to provide [Tma=Tmb]. As a result, the following equation (6) can be obtained by the equations (4) and (5) as described above.

$$Trb = Tra / (\eta P \cdot \eta N) \quad (6)$$

As the roll moment resulted from the inertia force of the vehicle body is approximately proportional to the lateral acceleration, the following equation (7) can be obtained by the equation (6), where the lateral accelerations obtained at the positions A and B are indicated by Ga and Gb, respectively.

$$Gb = Ga \cdot \{1/(\eta P \cdot \eta N)\} \quad (7)$$

Therefore, in such a range that the electric motor M is capable of producing the torque output (range for performing the active roll restraining control), the active roll restraining control is performed. Furthermore, if the turning state (lateral acceleration) is increased further, and exceeds the lateral acceleration Ga, which corresponds to the limit of the motor torque output (as indicated by the point A in FIG. 17), then the electric motor M will be controlled to hold its output. And, the lateral acceleration Gb (corresponds to the point B in FIG. 17, hereinafter, it is called as a stabilizer locking limit) where the electric motor M is to be reversed by the inertia force acting on the vehicle body can be obtained by holding the lateral acceleration corresponding to the limit of the motor torque output by the inverse of the product of the normal efficiency and the reverse efficiency of the speed reducing mechanism RD. Therefore, by holding the motor output, on the basis of the relationship between the normal efficiency, which is required when the electric motor M applies the torsion to the stabilizer bars SBfr and SBfl, and the reverse efficiency, which is required when the electric motor M is returned by the inertia force of the vehicle body, the relative displacement of the stabilizer bars SBfr and SBfl is locked in the range A-B as shown in FIG. 17.

According to the active roll restraining control apparatus, in the case where the output of the electric motor M does not cover all ranges for the active roll restraining control, with the efficiency (normal efficiency, reverse efficiency) of the speed reducing mechanism RD being designed and selected to be in an appropriate range, the maximal turning state of the vehicle is made to be equal to or smaller than Gb. Then, it is so controlled not to actually cause the B-C state in FIG. 17 (e.g., Gb is set to be sufficiently larger than the limit of tire friction), thereby to prevent a rapid increase of rolling of the vehicle body.

Figure 18:
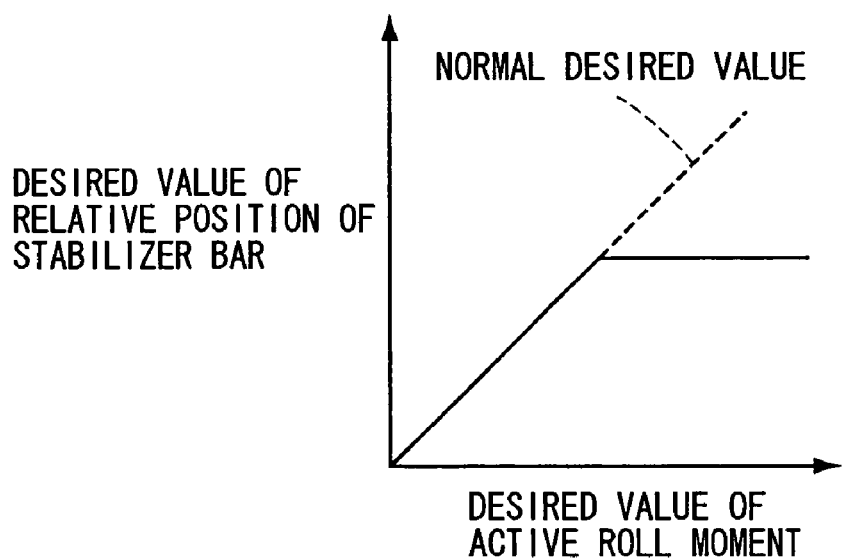
FIG. 18 is a graph showing an example of a map for setting a desired value of relative position of a stabilizer bar according to another embodiment of the present invention.

In the case where the output of the electric motor M does not cover all ranges for the active roll restraining control, such a characteristic is provided that the desired value of relative position of an ordinary stabilizer bar (as shown by a broken line), which is set to correspond to the desired value of the active roll moment, is restrained at its upper limit value, as shown in FIG. 18. With the desired value of relative position of the stabilizer bar being provided in accordance with the output limit of the electric motor M, if the holding torque with the efficiency of the speed reducing mechanism RD being taken into consideration is maintained, as explained with reference to FIG. 17, the characteristic A-B as shown in FIG. 17 can be ensured.

Then, in the same manner as the structure as shown in FIG. 13, the electric motor M is controlled according to PID, on the basis of the deviation of relative positions of the divided stabilizer bars (e.g., SBfr and SBfl). In this case, it is determined which one of the increased turning state, holding turning state and decreased turning state. And, based on the result of the determination, the PID gains are set. Consequently, the adaptation of the electric motor M can be achieved, and the small variation of the vehicle roll can be restrained, as well.

The invention claimed is:

1. A stabilizer control apparatus comprising:
    a stabilizer including a pair of stabilizer bars disposed between a right wheel and a left wheel of a vehicle, and an actuator having an electric motor and a speed reducing mechanism for transmitting power of said electric motor, with a normal efficiency and a positive reverse efficiency, said actuator being disposed between said pair of stabilizer bars;
    control means for controlling said electric motor in response to a turning state of said vehicle, to control a torsional rigidity of said stabilizer; and
    relative position detection means for detecting a relative position of said pair of stabilizer bars, wherein said control means controls said electric motor in response to the detected result of said relative position detection means.

2. A stabilizer control apparatus as set forth in claim 1, wherein said relative position detection means includes a rotational angle sensor for detecting a rotational angle of said electric motor.

3. A stabilizer control apparatus as set forth in claim 2, wherein said control means sets a desired value for the relative position of said pair of stabilizer bars, calculates a desired rotational angle of said electric motor on the basis of said desired value, and controls said electric motor according to a PID control on the basis of a deviation between said desired rotational angle and the rotational angle detected by said rotational angle sensor.

* * * * *